Feb. 8, 1955 — E. J. DILLMAN — 2,701,688
THERMOSTATICALLY OPERATED VALVES HAVING PRESSURE LIMITING MEANS

Filed June 22, 1949 — 2 Sheets-Sheet 2

INVENTORS
Earnest J. Dillman
BY
Andrew K. Foulds
their ATTORNEY

United States Patent Office 2,701,688
Patented Feb. 8, 1955

2,701,688

THERMOSTATICALLY OPERATED VALVE HAVING PRESSURE LIMITING MEANS

Earnest J. Dillman, Detroit, Mich., assignor to Detroit Controls Corporation, Detroit, Mich., a corporation of Michigan Application June 22, 1949, Serial No. 100,710

7 Claims. (Cl. 236—92)

This invention relates to new and useful improvements in flow controlling valves and more particularly to thermostatically operated valves having particular utility as refrigeration expansion valves.

One of the objects of this invention is to provide a flow controlling valve having a valve actuating means responsive to a condition of temperature or pressure and having a second condition responsive means dominating the control of the valve by the first-named means.

Another object is to provide a flow controlling valve having a thermostatically operated power element for actuating the valve and having a pressure responsive means operable to permit the valve to close independently of the state of actuation of the thermostatic power element.

Another object is to provide a flow controlling valve having a thermostatic power element for actuating the valve and having a pressure responsive member operable to move the power element bodily to permit the valve to close at a predetermined pressure and independently of the state of actuation of the power element.

Another object is to provide a refrigeration expansion valve of the "liquid charged" type having a novel means for limiting the pressure at which the valve may be operated.

Another object is to provide a "liquid charged" expansion valve having a bodily movable power element movably carried by a pressure responsive diaphragm or bellows which is operable at a predetermined maximum pressure to close off flow through the valve independently of the state of actuation of the power element.

Another object is to provide a "liquid charged" expansion valve having a pressure limiting means which may be adjusted for any desired maximum operating pressure.

Other objects will become apparent from time to time throughout the specification and claims as hereinafter related.

This invention comprises the new and improved construction and combination of parts and their cooperative relation to each other which will be described more fully hereinafter and the novelty of which will be particularly pointed out and distinctly claimed.

In the accompanying drawing to be taken as part of this specification there is clearly and fully illustrated two preferred embodiments of this invention in which drawings.

Figure 1:
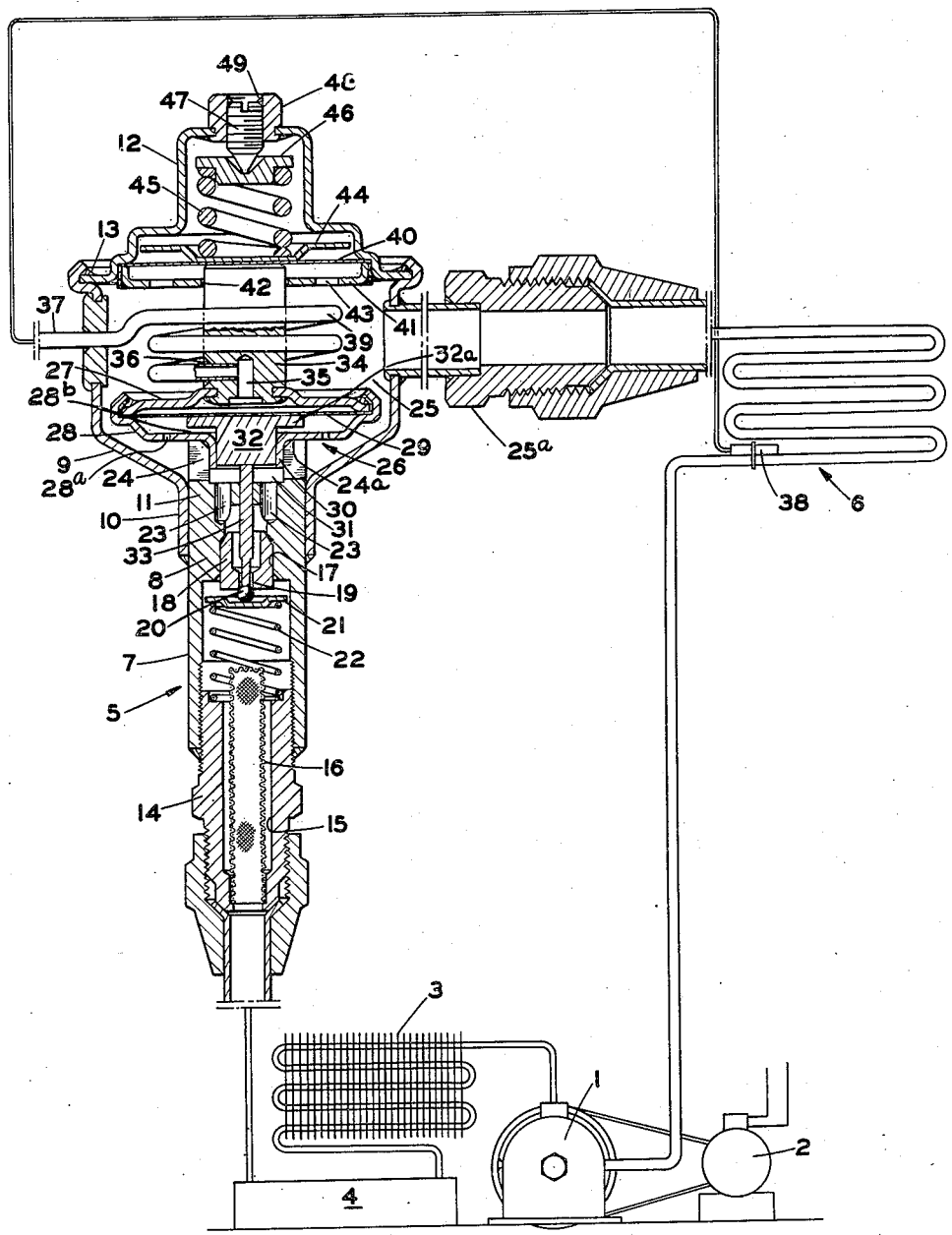
Figure 1 is a diagrammatic view of a refrigeration system in which is connected a refrigeration expansion valve embodying one form of this invention, the expansion valve being shown in longitudinal section.

Referring to the drawings by characters of reference, there is shown in Fig. 1 a refrigeration system comprising a compressor 1 driven by an electric motor 2, a condenser 3 connected to the discharge side of the compressor 1 and discharging into a refrigerant receiver 4. The receiver 4 is connected to the inlet of a refrigeration expansion valve generally designated as 5, the outlet from which is connected to a refrigerant evaporator 6 which is in turn connected to the suction side of the compressor 1. The refrigerant expansion valve 5 comprises a casing having a tubular inlet member 7 which is open at one end and which has a partition 8 at its other end. There is a cup-shaped casing member 9 having an aperture through its base with a sleeve portion 10 extending therefrom through which is fitted an extension 11 of the inlet member 7 and which includes the partition portion 8. There is a cup-shaped cover member 12 which closes the open end of the cup-shaped casing member 9 and which is secured thereto by an inturned flange and soldered as indicated at 13. In the open end of the tubular inlet member 7 there is screw-threadedly secured an inlet fitting member 14, which member has an inlet passageway 15 extending therethrough in which is positioned a strainer 16. The inlet fitting 14, tubular member 7, cup-shaped casing member 9, and cup-shaped cover member 12 define the valve casing as a whole in which are positioned the various operating parts of this valve.

The partition 8 of the tubular inlet member 7 has an aperture 17 therein in which is positioned a valve seat member 18 having a valve port 19 therethrough. There is a ball-shaped valve member 20 which is held in closing relation to the port 19 by a plate member 21 and valve closing spring 22. From the valve port 19 and passageway 17 apertures 23 and 24 open into the outlet chamber 25 enclosed by the cup-shaped casing member 9. An outlet fitting member 25a opens from the chamber 25 through the wall of the casing 9 and provides an outlet connection from the valve to the refrigerant evaporator. Positioned in the outlet chamber 25 is a thermostatic power element 26 which comprises a pair of dish-shaped members 27 and 28 which have secured therebetween at its periphery a pressure responsive diaphragm 29. The member 28 is provided with apertures 28a to permit pressure from the chamber 25 to enter adjacent the diaphragm 29 for response thereby. The dish-shaped member 28 has a sleeve portion 30 which is guided in a recess 31 in the projecting end portion 11 of the tubular inlet member 7 and seats on a stop formed by the shoulder 24a at the end of the projection 11. There is a cylindrical thrust transmitting member 32 which is guided in the sleeve 30 and which has a flanged upper end portion which abuts the diaphragm 29. The valve stem 33 is guided in an aperture in the partition 8 of the tubular member 7 and abuts at its opposite ends the valve member 20 and the thrust transmitting member 32 for transmission of valve opening movement therebetween. There is a cylindrical inlet member 34 which is secured and sealed in an aperture in the upper dish-shaped member 27 of the power element 26 and which has a passage 35 opening into the space enclosed between the dish-shaped member 27 and the diaphragm 29 and which has an aperture opening into the passage 35 in which is sealed one end 36 of a capillary tubing 37, the other end of which is connected to a thermal responsive bulb element 38. The portion of the capillary tubing 37 within the outlet chamber 25 is coiled about the cylindrical inlet member 34 as at 39 to permit bodily movement of the power element 26 without damaging the tubing or the connection at the power element. The power element (that is, the space enclosed between the dish-shaped member 27 and the diaphragm 29), the capillary tubing 37, and the bulb element 38 are charged with a volatile liquid of a quantity known in the refrigeration art as "liquid charge." There is a second diaphragm 40 which is positioned across the cup-shaped cover member 12 and which is sealed at its periphery thereagainst by a dish-shaped member 41. The member 41 has an aperture 42 through which extends the power element inlet member 34 the end of which abuts the diaphragm 40. There are also provided one or more apertures 43 in the dish-shaped member 41 to permit free response of the diaphragm 40 to refrigerant pressure in the outlet chamber 25. On the other side of the diaphragm 40 there is a dish-shaped backing plate 44 against which is compressively positioned a helical spring 45, the other end of which is supported by a flanged spring supporting member 46. There is an adjustment screw 47 which is secured in a fitting 48 on the end of the cover 12 and which abuts the spring supporting member 46 to determine the extent of compression of the spring 45. The spring adjustment screw 47 is sealed by solder as at 49 to prevent leakage of air or moisture into the valve but may be adjusted at any time by removal of said solder. It should also be noted that the inlet fitting member 14 although soldered in position to provide an air-tight valve is adjustable to determine the extent of compression of the valve closing spring 22.

In operation this form of the invention functions generally as follows:

The expansion valve 5 is shown in a valve closed position which would correspond to its position for a short time after the compressor 1 had been started. As the compressor is started up the refrigerant is drawn out of the evaporator 6 and the pressure is reduced in the outlet chamber 25 of the expansion valve 5 and upon sufficient reduction of pressure therein the diaphragm 29 in the power element 26 will be drawn downward by the differential of pressure thereacross and the valve member 20 moved to open position to permit flow of refrigerant to the refrigerant evaporator 6. During operation of the expansion valve the extent of opening of the valve member 20 is modulated by the evaporator temperature to which the bulb element 38 responds. The extent of compression of the valve closing spring 22 determines the force required to open the valve member 20 and thus determines the amount of superheat of refrigerant at the point of response of the bulb element 38. As it is well known in the refrigeration art, one of the principal disadvantages of "liquid charged" expansion valves is that there is no means provided for limiting the pressure of operation of the valve, the result being that during shut-down periods the pressure in the system may rise to a dangerously high value and yet the valve will open immediately upon start up of the refrigerant compressor, this resulting in not infrequent overloading of the motor.

In the present construction the power element 26 is bodily movable and is held in position against the end of the projecting portion 11 by the force of the spring 45 acting through the diaphragm 40. During the entire normal range of operation of this valve the power element is held in the position shown in Fig. 1 but during shut-down periods if the pressure should rise above a predetermined maximum value the diaphragm 40 will respond to such high pressure and move outward against the force of the spring 45 and permit the power element 26 to be moved bodily upward thus permitting the valve member 20 to close regardless of the state of actuation of the power element 26 or the state of temperature response of the bulb element 38. The thrust member 32 for the diaphragm 29 has a shoulder portion 32ª which cooperates with a shoulder portion 28ᵇ on the dished member 28 to limit the extent of movement of the diaphragm 29 so that when these elements are engaged movement of the diaphragm 40 will be operable to close the valve independently of further increased temperature at the bulb element 38. If, during such an extended shut-down period the power element has been bodily moved as described and the valve member 20 is thus closed the compressor upon starting will have to reduce the pressure in the outlet chamber 25 of the valve below the predetermined maximum operating pressure in order to permit the power element 26 to be moved back to the position shown in Fig. 1 from which position it will then operate as a normal "liquid charged" valve. It should also be noted that the coiling of the capillary tubing within the outlet chamber 25 permits bodily movement of the power element for the aforementioned pressure regulating action without damage to the tubing or to the connection at the power element. By varying the compression of the spring 45 by the adjustment screw 47 the pressure at which the diaphragm 40 and the power element 26 will be moved can be varied to any desirable value. This last-mentioned feature of variable maximum operating pressure for "liquid charged" expansion valves is a feature completely unknown in the expansion valve art of today.

Figures 2, 3:
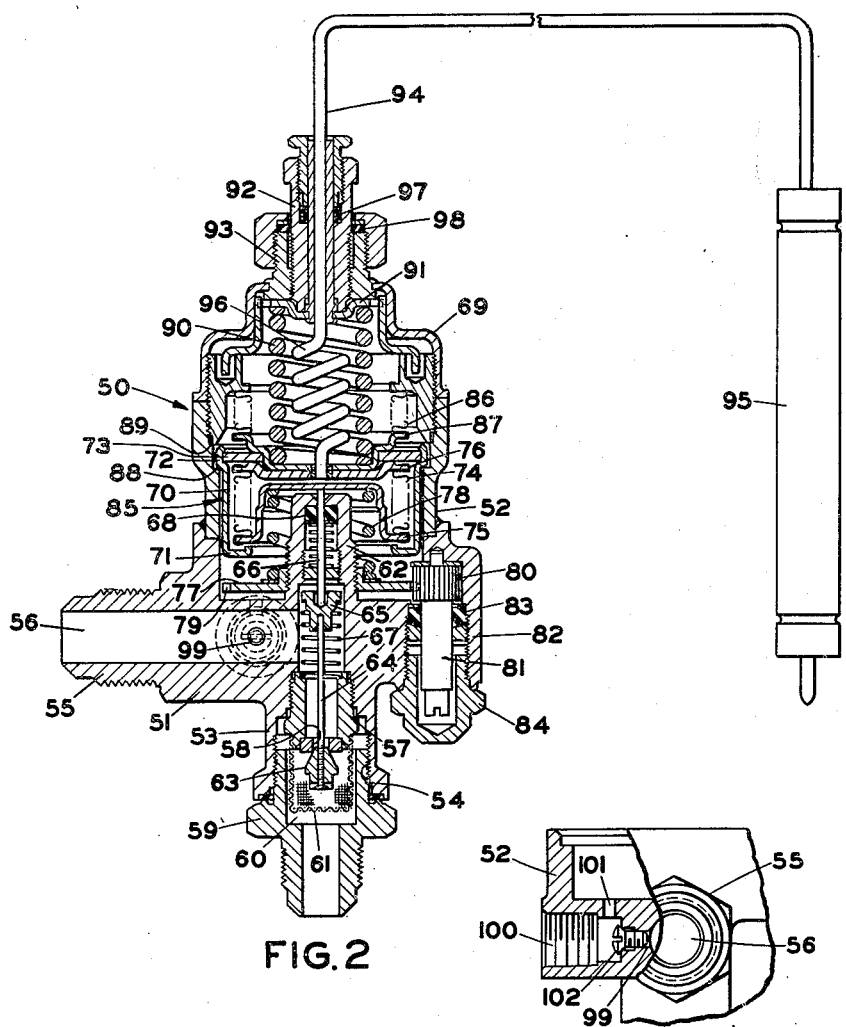
Fig. 2 is a longitudinal sectional view of a modification of the valve shown in Fig. 1.
Fig. 3 is a detailed broken section of a portion of the valve casing shown in Fig. 2 which shows the external equalizer connection for this valve.

In the form of the invention shown in Figs. 2 and 3 the expansion valve is modified slightly in construction to facilitate adjustment of superheat setting and of maximum operating pressure. In this valve there is a casing generally designated as 50 which comprises a body portion 51 and a hollow casing portion 52 extending from the body portion. A first hollow projection 53 extends from the casing body portion and provides an inlet passage 54. Similarly, there is a second hollow projection 55 which extends laterally from the body portion 51 and which provides an outlet passageway 56 intersecting the inlet passageway 54 within the casing body portion 51. A valve seat member 57 is screw-threadedly secured in the body portion 51 and provides a valve port 58 controlling flow from the inlet passage 54 to the outlet passage 56. There is an inlet fitting member 59 which is screwed into the inlet projection 53 and which encloses an inlet chamber 60 in which is positioned a strainer 61. The valve casing body portion 51 has a hollow projection 62 which extends into the hollow casing portion 52 and which is alined with the inlet passage 54 and valve port 58. There is a valve member 63 which cooperates with the port 58 to control flow through the valve and which is carried by a valve stem 64. The valve stem 64 has at its end opposite the valve member 63 a flanged member 65 which receives a thrust transmitting stem 66 and which is held in operating engagement therewith by a spring 67. The valve stems 64 and 66 form a two part valve operating stem which provides for lost motion after the valve member 63 has seated. The valve operating stem 66 extends through and is guided in an aperture in the end of the hollow projection 62 and is surrounded with packing 68 which prevents leakage from the valve passages into the hollow casing end 52 of the valve. There is a cup-shaped cover member 69 which closes the end of the valve casing portion 52 and which encloses therewith a sealed chamber. There is a power element positioned in the hollow casing portion 52 of the valve which comprises a cylindrical member 70 having an inturned flange portion 71 at one end and an out-turned and in-turned flange portion 72 securing an end wall 73 at its other end. There is an expansible and contractible bellows element 74 having a cup-shaped movable head 75 at one end and having a fixed head 76 at its other end abutting the end wall 73 of the cylindrical member 70. The movable head 75 of the bellows element 74 cooperates with the valve stem 66 for operating the valve and is limited in its opening movement by engagement with the inturned flange 71 of the cylindrical member 70. There is a disc-shaped spring supporting member 77 which is screw-threadedly and adjustably carried by the casing projection 62 and which supports one end of a spring 78, the other end of which abuts the movable bellows head 75 and resists valve opening movement. The spring supporting member 77 has a plurality of gear teeth 79 at its periphery and is engaged by a pinion gear 80 for adjustment. The pinion gear 80 is carried by an operating shaft 81 which extends exterior of the valve casing through a hollow projection 82. The projection 82 is provided with packing 83 to prevent leakage from the valve and is provided with a cap or cover member 84 to prevent inadvertent adjustment of the pinion gear 80. The power element bellows 74 and cylindrical member 70 provide a power element cage structure which is generally designated as 85 and which is reciprocally movable in the valve casing portion 52. There is a second bellows element 86 which has a movable head 87 secured to the fixed head 76 of the power element bellows for movement of the power element cage structure 85. The bellows 86 is secured at the periphery of its open end to the wall of the hollow casing portion 52 adjacent the cover member 69. The hollow valve casing portion 52 has lower and upper shoulders 88 and 89 provided therein which limit the movement of the power element cage 85, the cage 85 having its flange portion 72 normally resting on the lower shoulder 88 and held in position by a spring 90 which is compressively positioned between the bellows head 87 and a spring supporting member 91 carried adjacent the cover member 69. There is a sleeve member 92 which is screw-threadedly and adjustably carried in an inlet fitting member 93 on the cover member 69 and which carries the spring supporting member 91 for adjustment thereof. The power element bellows 74 is provided with capillary tubing 94 which opens thereinto at one end and which carries at its other end a power element bulb 95. The power element bulb 95, tubing 94, and power element bellows 74 enclose a volatile thermostatic liquid of a quantity defined as "liquid charge." As was described for the valve shown in Fig. 1 the capillary tubing 95 is coiled within the valve casing as indicated at 96 to facilitate movement of the power element cage structure 85. The adjustment sleeve and inlet fitting for the cover member 69 is provided with packing as indicated at 97 and 98 to prevent leakage at the point of adjustment of the adjustment sleeve 92. From the outlet passageway 56 an aperture 99 opens laterally through the valve casing into an external opening or connection 100. The external connection 100 is provided with a passage or aperture 101 opening into the hollow power element casing portion 52. The last-mentioned openings are provided so that this valve may be used either with an external equalizer connection or as an internally equalized valve.

In Fig. 3 the connections are shown with a plug screw 102 closing the aperture 99 so that the external connection may be used for response to pressure at the outlet end of the refrigerant evaporator. If it is desired to have this valve respond to evaporator inlet pressure the external connection 100 would be plugged and the plug screw 102 removed.

In operation this valve functions substantially the same as that shown and described in Fig. 1. It is responsive to bulb element temperature and to pressure within the valve casing or to pressure at the outlet end of the evaporator depending upon the type of connection used. The spring 78 which abuts the power element bellows head 75 determines the force required for opening the valve and hence determines the superheat setting of the valve. The pinion gear adjustment mechanism 80, 81 provides a simple and efficient means for adjustment of the superheat setting of the valve. In this form of construction the power element cage is held by the spring 90 with its flange portion 72 normally resting on the casing shoulder 88. Throughout the range of normal valve operation this valve functions as an ordinary "liquid charged" expansion valve. However, when the pressure within the valve (or in the evaporator depending on the type of connection used at the external connection 100) rises above the maximum operating pressure this pressure acting against the power element cage 85 and the pressure responsive bellows 86 will cause the power element cage 85 to be moved upward and permit the valve member 63 to close independently of the state of actuation of the power element. By adjustment of the sleeve member 92 the compressive force of the spring 90 against the bellows 86 may be varied in order to vary the maximum operating pressure of the valve to any desired value.

It should be noted that while the valves which have just been described are designed particularly for use in refrigeration systems they could conceivably be used for other applications and would provide a simple pressure regulating means for any temperature operated valve.

Having thus described the invention what is claimed and is desired to be secured by Letters Patent of the United States is:

1. In a flow controlling valve, a valve member spring loaded to an initially closed position, a temperature responsive means operable upon change in temperature to move said valve member toward open position, said responsive means being bodily movable, stop means for said responsive means, means urging said responsive means with a predetermined force to an initial predetermined position against said stop means, and a pressure responsive means operatively connected to said temperature responsive means and operable upon occurrence of a predetermined pressure to move the same from said predetermined position away from said stop means in a direction permitting said valve member to close independently of the temperature state of said temperature responsive means.

2. A refrigeration expansion valve for controlling flow to a refrigerant evaporator, comprising a casing having an inlet, an outlet, and a valve port therebetween, a valve member controlling flow through said port and having an initially closed position, a bodily movable power element positioned in said casing and enclosing a thermally responsive volatile liquid, said power element having a movable wall member cooperable with said valve member upon rise in temperature to move said valve member toward open position and exposed for response also to pressure on the outlet side of the valve, a spring resisting opening movement of said valve member and determining the superheat setting of the valve, stop means for said power element, means urging said power element with a predetermined force to an initial predetermined position against said stop means, a movable pressure responsive wall member operatively connected to said power element for moving the same and positioned for response to refrigerant pressure on the outlet side of the valve, and said last-named wall member being operable at a predetermined pressure to move said power element from said predetermined position away from said stop means in a direction permitting said valve member to close and independently of the state of response of the power element.

3. A refrigeration expansion valve for controlling flow to a refrigerant evaporator, comprising a casing having an inlet, an outlet, and a valve port therebetween, a valve member controlling flow through said port and having an initially closed position, a bodily movable thermostatic power element positioned in said casing and having a movable wall member, a bulb element, capillary tubing connecting said bulb element to said power element, said power element, said bulb element, and said tubing enclosing a thermally responsive volatile liquid of a quantity defined as a "liquid charge," said movable wall member being cooperable with said valve member upon rise in temperature of said volatile liquid to move said valve member toward open position and being exposed for response also to pressure on the outlet side of the valve, a spring resisting opening movement of said valve member and determining the superheat setting of the valve, stop means for said power element, means urging said power element with a predetermined force to an initial predetermined position against said stop means, said capillary tubing having a portion within said casing and adjacent said power element helically coiled to permit bodily movement of said power element without damaging the tubing or the connection to the power element, a movable pressure responsive wall member operatively connected to said power element for moving the same and positioned for response to refrigerant pressure on the outlet side of the valve, and said last-named wall member being operable at a predetermined pressure to move said power element from said predetermined position in a direction away from said stop means and permitting said valve member to close independently of the state of response of the power element.

4. A refrigeration expansion valve for controlling flow to a refrigerant evaporator, comprising a casing having an inlet, an outlet, and a valve port therebetween, a valve member controlling flow through said port and having an initially closed position, a bodily movable power element positioned in said casing and enclosing a thermally responsive volatile liquid, said power element having a movable wall member cooperable with said valve member upon rise in temperature to move said valve member toward open position and exposed for response also to pressure on the outlet side of the valve, a spring resisting opening movement of said valve member and determining the superheat setting of the valve, a first stop means determining the maximum range of valve opening movement, a second stop means for said power element, said power element being held in an initial predetermined position against said second stop means, a movable pressure responsive wall member operatively connected to said power element for moving the same, a third stop means limiting the range of movement of said last-named wall member to a predetermined distance at least as great as said maximum range of valve opening movement, said last-named wall member being positioned for response to refrigerant pressure on the outlet side of the valve and operable at a predetermined pressure to move said power element from said predetermined position in a direction away from said second stop means and permitting said valve member to close and independently of the state of response of the power element, a spring compressively abutting said last-named wall member and determining the pressure required for movement of said power element, and a screw-threaded adjustment member for adjusting the compression of said last-named spring.

5. In a refrigeration expansion valve, a casing comprising a tubular inlet member having an inlet opening at one end and a partition at the other end with an aperture therethrough providing a valve port and valve seat, a cup-shaped casing member having an open end and a sleeve portion extending from its base, said inlet member being secured in said sleeve portion with the other end thereof projecting into said cup-shaped casing member, a cup-shaped cover member and flexible pressure responsive diaphragm closing said cup-shaped casing member and defining therewith an outlet chamber, an outlet fitting opening through the side wall of said cup-shaped casing member, a power element positioned in said outlet chamber comprising a separable casing and a pressure responsive diaphragm sealed therein, one of the parts of said power element casing having a sleeve extending therefrom with a thrust member positioned therein having a flanged head portion abutting said last-named diaphragm, said inlet member projecting end having a cylindrical recess and side apertures for discharge of refrigerant from said valve port into said outlet chamber, said power element seating against the projecting end of said inlet member with its sleeve portion guided in said recess, the other part of said power element casing having secured thereon a thrust transmitting member abutting said first-named diaphragm and having an inlet passageway opening into said power element, capillary tubing having a bulb element at one end and having its other end coiled around said power element in said outlet chamber and sealed in said power element inlet passageway, said bulb element, said tubing, and said power element enclosing a volatile liquid of a quantity comprising a "liquid charge," a valve member cooperable with said valve port, a spring holding said valve member initially closed, an inlet fitting screw-threaded in said inlet opening and adjustably abutting said valve spring to determine the compression thereof, a valve stem abutting said valve member and said first-named thrust member for transmission of movement from said power element, said first-named diaphragm being responsive to outlet chamber pressure and operable at a predetermined pressure to move said power element bodily in a valve closing direction independently of the state of temperature response thereof, and a spring compressively positioned between said cup-shaped cover member and said first-named diaphragm and determining the pressure required for moving said power element.

6. In a refrigeration expansion valve, a casing comprising a body portion and a hollow casing portion extending therefrom, first and second hollow projections extending from said body portion and providing inlet and outlet passages intersecting within said body portion, a valve seat member having a port positioned in said inlet passage, said body portion having a hollow projection alined with said inlet passage and extending into said hollow casing portion, a valve member initially closing said port, a valve stem carrying said valve member and extending through said port and said last-named projection into said hollow casing portion, a cover member closing the end of said hollow casing portion and enclosing therein a sealed chamber, a power element bellows in said chamber having a movable head operatively engaging said valve stem, a disc-shaped spring supporting member screw-threadedly carried by said last-named projection, a spring compressively positioned between said supporting member and said bellows head and adjustable by movement of said supporting member, a cylindrical cage carrying said power element bellows and having an inturned flange at one end limiting movement of said bellows head, said cage being movable longitudinally of said hollow casing portion, said hollow casing portion having upper and lower annular shoulders engageable with and operable to limit movement of said cage, a second bellows element secured to the walls of said hollow casing portion and having a movable head secured to said cage, capillary tubing opening at one end into said power element bellows and having at its other end a bulb element, said power element bellows, tubing and bulb element enclosing a volatile liquid of a quantity defined as a "liquid charge," said tubing having a portion within said hollow casing portion coiled to permit movement of said power element without damaging the tubing or the power element connection, said second bellows element responding to pressure to move said cage and power element in a valve closing direction, a spring compressively abutting said second bellows element and determining the pressure of response thereof, and a screw-threaded adjustment member abutting said last-named spring to determine the extent of compression thereof.

7. A refrigeration expansion valve for controlling flow in a refrigeration system, comprising a casing having an inlet, an outlet, and a valve port therebetween, a valve member controlling flow through said port and having an initially closed position, a thermostatic power element including a first pressure responsive diaphragm responsive on one side to pressure on the outlet side of the valve and actuated by a temperature responsive volatile power element charge, means interconnecting said diaphragm and said valve member for transmission of movement therebetween, a second diaphragm positioned for response to pressure in the system and associated with said first diaphragm to modify the response thereof, stop means for said second diaphragm, spring means urging said second diaphragm into stopping engagement with said stop means, said second diaphragm being movable upon occurrence of a predetermined pressure away from said stop means to modify the responsive movement of said valve member by said first diaphragm, means interconnecting said first and second diaphragms and operable upon predetermined movement of said second diaphragm to render said first diaphragm ineffective to move said valve member, and adjustable supporting means cooperable with said spring means and accessible from external of said valve casing to adjust the spring force of said spring means to vary the condition required for actuation of said second diaphragm.

References Cited in the file of this patent

UNITED STATES PATENTS

| | | |
|---|---|---|
| 853,541 | Eddy | May 14, 1907 |
| 1,978,709 | Hill | Oct. 30, 1934 |
| 2,192,117 | Wile | Feb. 27, 1940 |
| 2,201,728 | Hoesel | May 21, 1940 |
| 2,220,998 | Holmes | Nov. 12, 1940 |
| 2,399,088 | Andrews | Apr. 23, 1946 |
| 2,463,951 | Carter | Mar. 8, 1949 |
| 2,505,933 | Aughey | May 2, 1950 |
| 2,542,802 | Ehlke | Feb. 20, 1951 |